United States Patent [19]

Rueb

[11] Patent Number: 5,663,795
[45] Date of Patent: Sep. 2, 1997

[54] METHOD OF CALIBRATING LASER POSITIONS RELATIVE TO WORKPIECES

[75] Inventor: Kurt Rueb, Kitchener, Canada

[73] Assignee: Virtek Vision Corp., Ontario, Canada

[21] Appl. No.: 522,985

[22] Filed: Sep. 7, 1995

[51] Int. Cl.⁶ ............................................. G01B 11/14
[52] U.S. Cl. ............................................. 356/375; 356/243
[58] Field of Search ................................ 356/375, 376, 356/372, 243; 250/235; 29/407, 897.31, 897.3, 897.312

[56] References Cited

U.S. PATENT DOCUMENTS

| | | | |
|---|---|---|---|
| 4,375,921 | 3/1983 | Morander | 356/243 |
| 4,396,945 | 8/1983 | DiMatteo et al. | 356/375 |
| 4,682,894 | 7/1987 | Schmidt et al. | 356/375 |
| 4,744,664 | 5/1988 | Offt et al. | 356/375 |
| 4,925,308 | 5/1990 | Stern et al. | 356/375 |
| 5,388,318 | 2/1995 | Petta | 250/235 |
| 5,396,331 | 3/1995 | Kitoh et al. | 356/375 |
| 5,530,548 | 6/1996 | Campbell et al. | 356/375 |

*Primary Examiner*—Hoa Q. Pham
*Attorney, Agent, or Firm*—Howard & Howard

[57] ABSTRACT

An improved method of calibrating the location of a laser projector relative to a workpiece utilizes a series of randomly-placed reference points, with at least two of the points being spaced by a known distance. Known calibration equations allow the identification of the location of the laser relative to the workpiece by identifying the location of the laser relative to the points, and also utilizing the known distance. The laser may be utilized with at least one other component. The second component might be a second laser. If there are reference points fixed relative to a frame of reference then the laser may also be utilized to accurately display information on the workpiece.

14 Claims, 1 Drawing Sheet

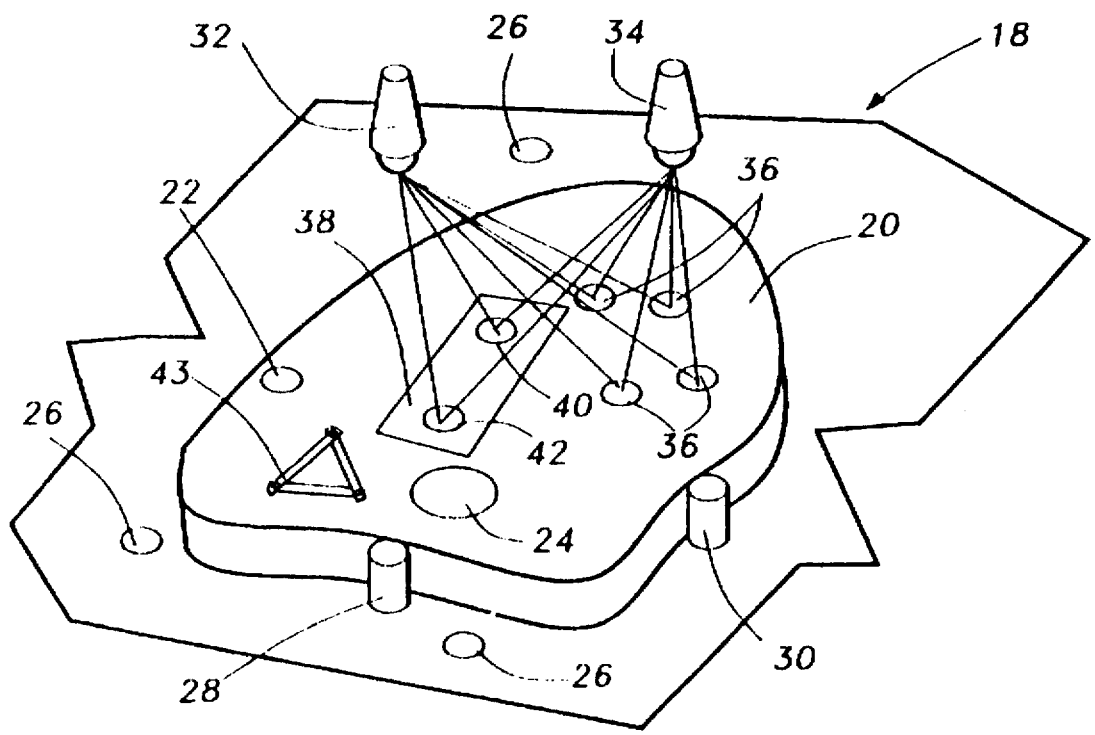
Fig-1A
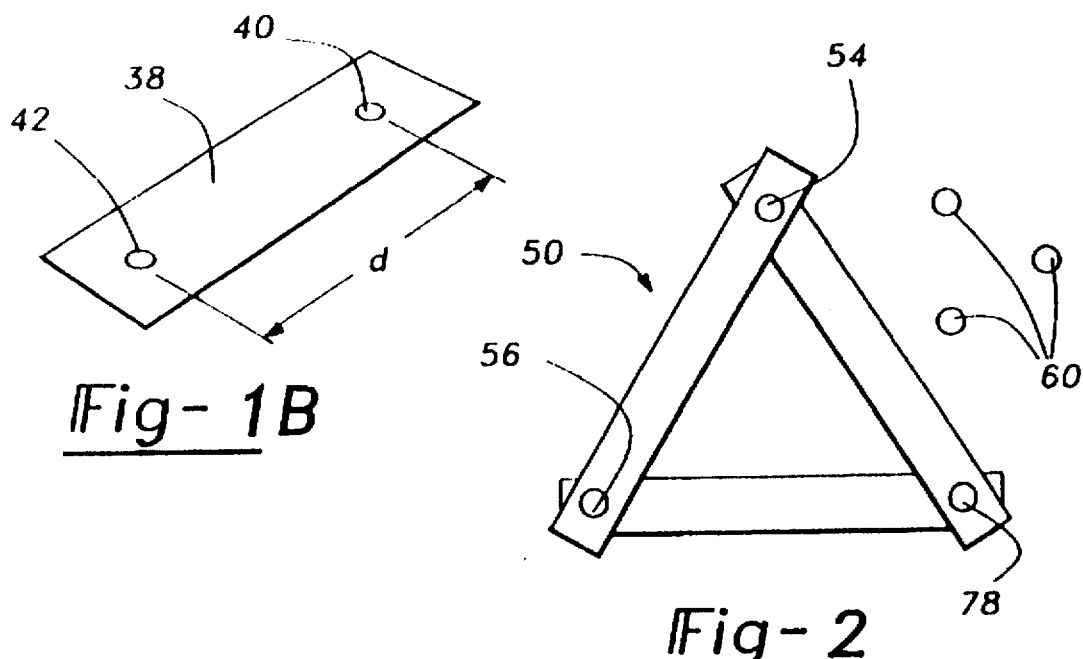
Fig-1B
Fig-2

METHOD OF CALIBRATING LASER POSITIONS RELATIVE TO WORKPIECES

BACKGROUND OF THE INVENTION

This invention relates to a unique and simplified method of calibrating the location of at least one laser projector relative to a workpiece.

Laser projection systems are known, and utilized to project images from a laser onto a workpiece or to digitize information about the workpiece. As examples, laser projectors are utilized to project the desired location of frame members for a truss, or the location of laminate layers for frames such as airplane fuselages. In those applications, it is important that a control for the laser projector knows where the laser is identically relative to the workpiece and a fixed reference frame. Thus, in the prior art, location sensors have been incorporated into a table or platform which holds the workpiece. In one example shown in U. S. Pat. No. 5,388,318, a series of such sensors are positioned on a table surrounding the location of the workpiece. The location of each of those fixed sensors relative to the laser projector is identified using known calibration equations; and thus a control for the system is able to calibrate the location of the laser projector relative to the table. The laser projector may then project information or images on the workpiece or table, since the laser control is able to identify the exact location of the laser projector relative to a fixed reference which supports the workpiece.

In some applications, the workpieces are simply too large to allow room around the workpieces for fixed sensors. The fixed sensor system such as disclosed in the above-referenced United States patent has proven valuable for smaller workpieces such as trusses. However, when larger workpieces are assembled utilizing these techniques, there is sometime insufficient room for several sensors to be placed around the workpiece.

In other applications, lasers may be utilized in combination with cameras to digitize information about the workpiece surface. As an example, a laser may be utilized to display the location of parts to be cut from a fabric or leather material. In such applications, the laser projector does not need to know where it is at identically relative to a fixed reference; however, the laser must be able to reference the distance between locations on the workpiece, such as flaws, etc. In other applications of digitization, the laser systems may be utilized to check the quality of the workpiece by checking the distance between features on a workpiece. As one example, a laser-based system may be utilized to check the distance between two parts on an airline fuselage.

In the prior art, the laser-based systems have typically required an extensive setup to calibrate the position of the lasers relative to fixed reference positions. This is time consuming, and requires some specific expertise in calibrating the laser or camera control relative to the position of the sensors.

SUMMARY OF THE INVENTION

In a disclosed embodiment of this invention, a method is utilized wherein the sensors need not be fixed relative to the workpiece. Rather, the sensors may be scattered randomly around the workpiece. The distance between at least two of the sensors is fixed. Known calibration equations can solve the position of the laser system components relative to each other, and identically relative to locations on the workpiece. A required number of sensors is preset for each number of laser projectors or cameras that are utilized. All that is required is that at least two of the sensors be spaced from each other by a set distance. The set of equations for a particular application may then be solved identically since the distance between at least two of the sensors is known. The equations used to calibrate the laser components are known, and form no part of this invention. Rather, it is the use of a fixed distance between at least two of the sensor points which is the inventive feature of this application.

In one embodiment of this invention, the inventive sensors may be utilized for a workpiece that is relatively large. It would be impractical to space fixed sensors around the workpiece in locations such that the laser would be able to identify the sensors once the workpiece is placed on the platform. In other applications, the sensors may be placed about the workpiece such that elaborate pre-setup calibration is unnecessary. The laser projectors identify the position of the scattered sensors and identify the locations of the laser projectors relative to the sensors. The control then has a frame of reference relative to the workpiece and is able to digitize locations on the workpiece.

In one embodiment of this invention, a system includes at least one laser projector, and a second component that may be a second laser. At least six sensors are necessary to calibrate the position of the laser projector and the other component. At least two of the sensors are formed on a single bar such that they are spaced by a known distance. The six sensors may be scattered randomly about the surface of the workpiece. The laser and the other component bounce beams off the sensors and the reflected beams are used to identify the positions of each of the six sensors. The known calibration equations may then be solved identically such that the laser and the other component identify their relative positions, and also identify their positions relative to each of the six sensor locations.

If there is no fixed sensor, the laser and the other component will not be able to identify exactly where they are relative to a fixed frame of reference. However, the laser and the other component will be able to identify a frame of reference on the workpiece and can identify distances between any features on the workpiece. That is, with this system, the laser and the other component is able to digitize, identify and store surfaces on the workpiece. If there are at least three fixed references, off of the workpiece and on a platform or other holding structure for the workpiece, then the laser and other component is able to identify exactly where they are relative to the workpiece. Also, it may be possible to utilize references points on the workpiece as fixed references. As an example, if the workpiece is formed with a grid, the origin and x/y axes may be used as fixed references under certain conditions. With a fixed sensor system, the laser is able to identify and project locations for pare to be assembled on the workpiece, as disclosed generally in the United States patent referenced above.

Moreover, this invention also simplifies the calibration of the prior art systems wherein there are several fixed sensors. Those systems require extensive initial calibration. The present invention eliminates this initial calibrating and replaces it with a simpler method.

In other embodiments of this invention, there may be three sensors fixed together into a triangular array. This will simplify the equations, and make identification and calibration of the location of the lasers simpler.

BRIEF DESCRIPTION OF THE DRAWINGS

FIG. 1A is a schematic view of a laser-based system calibrating its location and the location of another component relative to a workpiece.

FIG. 1B is a detail from FIG. 1A.

FIG. 2 shows a second embodiment sensor calibration system according to the present invention.

DETAILED DESCRIPTION OF A PREFERRED EMBODIMENT

FIG. 1A schematically shows a laser system 18 that may be utilized for laser projection or laser digitization of the surface of a workpiece 20. Workpiece 20 may have surface features such as shown at 22 and 24. Feature 22 and 24 might be features on the workpiece such as the location of bolt holes, etc. One prior use for laser-based systems such as the system shown schematically at 18 is to check the distances between features such as feature 22 and 24. To provide such distance monitoring, a laser system must be able to fix a frame of reference on the workpiece. The present invention provides a simplified method for doing so.

In addition, optional fixed reference sensors are shown schematically at 26. Fixed reference sensors 26 are fixed on a surface other than the workpiece. It may also be possible to use points on the workpiece, as discussed above. Holding members 28 and 30 hold the workpiece 20 in a set position relative to the fixed or anchor sensor 26. The holders 28 and 30 are shown schematically, and any type of work-holding jig may be utilized in accordance with this feature of the invention. A laser projector 32 is positioned in combination with a second laser projector 34. A series of sensors 36 are randomly spaced about the surface of workpiece 20. A fixed distance sensor 38 includes two sensors 40 and 42. Sensors 36, 40 and 42 are preferably formed of reflective material such that laser 32, or laser 34, will be able to bounce a beam off of the reflective material and receive a return image to calibrate their locations relative to the location of the sensors 36, 40 and 42. This type of identification of the location of a sensor is known in the prior art. The prior art has typically utilized such calibration with fixed sensors such as sensor 26. In the present invention, sensors 36 and 38 may be separate pieces of material that are simply spread randomly on the surface of workpiece 20.

It is known that complicated calibration equations may be utilized to identify the locations of the laser projectors relative to surfaces on the workpiece 20. For a two component system such as shown in FIG. 1, six reference points are necessary to identify the location of the components 32 and 34 (or 35). As shown schematically in this figure, each of the components 32 and 34 (or 35) bounce beams off of the six sensor points. By determining the angle from the component to the sensor, a set of six rays is identified. The six rays from the two sensors 32 and 34 allow a control for the two components to solve and identify their angular positions relative to each other. However, the system cannot then accurately identify the specific distance between the components 32 and 34 and the surface of the workpiece 20, and thus cannot accurately identify the location of surfaces on the workpiece.

The fixed distance sensor 38, has the two sensor points 40 and 42 spaced by a known distance d as shown in FIG. 1B. The equations used for calibration of the components 32 and 34 now provide an accurate identification of the location of the parts 32 and 34 relative to any surface on the workpiece 20. By identifying the location of the six sensor locations 36, 40 and 42, a control for the laser 32 and the laser 34 (or camera 35) know where they are relative to reference positions on the workpiece 20. The laser or camera may then identify the exact locations of features 22 and 24 relative to any one of the sensors. In this way, the laser can digitize the surface of the workpiece, quality check the distance between the features 22 or 24, or store information about the specific location of features on the workpiece.

As known, the laser projectors are preferably utilized with a galvanometer. The term "laser projector" as used in this application is meant to describe the combined projector and galvanometer. The camera 35 is preferably utilized with a galvanometer as disclosed in copending U.S. patent application Ser. No. 08/495,190. The rays directed into the camera are those utilized for calibration.

Applications for such systems include not only checking the distance between the features 22 and 24, but storing information about the workpiece such that other computer programs may plot optimum utilization of the workpiece. In one example, a computer may optimize the location of parts to be cut out of a piece of leather. Digitization of the surface of a piece of leather workpiece is utilized to determine location of flaws, or different grades of quality on the leather. Known computer programs may then be utilized to determine optimum locations for cutting particular portions from the leather.

When at least three fixed sensors, such as sensors 26, replace some of the random sensors 36, then the lasers 32 and 34 or a laser 32 and camera 35 can identify where they are identically relative to a fixed frame of reference, and can project information on the workpiece such as shown schematically at 43. Image 43 is a schematic view of a laser-projected image that might be utilized as a location for placement of a part. Since the laser will know identically where it is relative to a fixed reference, and since the workpiece is fixed relative to the fixed sensor 26, the laser will be able to exactly identify the location for the projected image 43.

As shown in FIG. 2, the two-part distance bar 38 can be replaced by a triangular bar 50. Triangular sensor 50 includes spaced sensor points 54, 56 and 58, all spaced by known distances. Sensor 50 is used with three other sensors 60 that would be spread randomly about the workpiece. The system again identifies the location of the components relative to the workpiece by identifying the positions of the sensors.

The location sensors allow the projector or other components to identify their angular location relative to each other and relative to the sensor positions. However, without a fixed distance, the scale of the angular distances between the various parts may not be identified. The inventive sensors spaced by a fixed distance allows the calibration equations to be utilized to identically solve for the relative locations of the projector, camera, and sensors.

As more or less laser components are utilized, more or less sensors are necessary to identify the specific location of the laser relative to the workpiece. Again, the equations and number of reference points necessary for calibration of particular combinations of lasers and cameras are known in the art. It is the inventive use of at least two of the sensor points spaced by a known distance that forms the inventive features of this application.

Although a preferred embodiment of this invention has been disclosed, a worker of ordinary skill in the art would recognize that certain modifications would come within the scope of this invention. For that reason, the following claims should be studied to determine the true scope and content of this invention.

I claim:

1. A method of calibrating a laser projector relative to a workpiece comprising the steps of (1) placing a workpiece in a location such that a laser beam is positioned to be directed from a laser projector onto said workpiece;

(2) providing a plurality of sensors, with at least two of said plurality of sensors being spaced by a known distance;

(3) placing said sensors at unknown positions about or near a surface of said workpiece;

(4) projecting a laser beam from a laser projector at said sensors;

(5) identifying the location of said sensors relative to said laser projector; and (6) calibrating the location of said laser projector relative to said sensors on said workpiece by utilizing the known distance between said sensors.

2. A method as recited in claim 1, wherein said system includes at least one laser projector and another component, and there are at least six of said sensors.

3. A method as recited in claim 2, wherein said other component is also a laser projector.

4. A method as recited in claim 1, wherein a plurality of said sensors are fixed and mounted in a known location.

5. A method as recited in claim 4, wherein said fixed sensors are mounted off said workpiece.

6. A method as recited in claim 4, wherein said laser is utilized to project an image on said workpiece, the location of said image being set by said sensors, and said fixed sensor.

7. A method as recited in claim 1, wherein three of said sensors are formed into a triangle and spaced by fixed distances.

8. A method of identifying the location of at least one laser projector and one other component relative to a workpiece comprising the steps of:

(1) providing a laser projector and at least one other component, and providing a workpiece in a location such that said laser projector and said other component is positioned to project a beam or receive a reflected beam from said workpiece, and providing a plurality of sensors on or about said workpiece at random unknown locations relative to said workpiece, at least two of said randomly located sensors being spaced by a known distance;

(2) utilizing said laser projector and said other component to identify the location of said sensors relative to said laser projector and said other component; and (3) utilizing a formula to calibrate the location of said laser projector and said other component relative to said sensors, solving for the location of said laser projector and said other component by utilizing said known distance between said two sensors; and (4) then performing work on said workpiece utilizing the calibration location relative to said workpiece provided by steps 1–3 above.

9. A method as recited in claim 8, wherein a plurality of said sensors are fixed.

10. A method as recited in claim 9, wherein said fixed sensors are located off of said workpiece.

11. A method as recited in claim 9, wherein said fixed sensors are utilized to identify the location of said laser projector and said other component relative to a workpiece such that said laser projector may be utilized to project an image on said workpiece.

12. A method as recited in claim 8, wherein said calibration is utilized to provide a reference base on said workpiece to digitize the location of features on said workpiece.

13. A method as recited in claim 12, wherein said digitization is utilized to store information about the surface of said workpiece.

14. A method as recited in claim 12, wherein said digitization is utilized to measure the distance between features on said workpiece.

* * * * *